United States Patent
Yamazaki et al.

(10) Patent No.: US 6,932,379 B2
(45) Date of Patent: Aug. 23, 2005

(54) AIR BAG SYSTEM IN SCOOTER TYPE VEHICLE

(75) Inventors: Takeshi Yamazaki, Saitama (JP); Satoshi Iijima, Saitama (JP); Yoshitaka Yanagibashi, Saitama (JP); Takeshi Kuroe, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 144 days.

(21) Appl. No.: 10/417,166

(22) Filed: Apr. 17, 2003

(65) Prior Publication Data

US 2004/0026904 A1 Feb. 12, 2004

(30) Foreign Application Priority Data

Apr. 18, 2002 (JP) ........................................ 2002-116680

(51) Int. Cl.[7] ............................ B62J 27/00; B60R 21/22
(52) U.S. Cl. ................. 280/730.1; 180/219; 297/216.1; 280/728.1
(58) Field of Search .......................... 280/730.1, 728.1; 296/68.1; 180/219, 220; 297/216.1; B62J 27/00

(56) References Cited

U.S. PATENT DOCUMENTS

| | | | | | |
|---|---|---|---|---|---|
| 5,938,231 | A | * | 8/1999 | Yamazaki | 280/730.1 |
| 6,007,090 | A | * | 12/1999 | Hosono et al. | 280/730.2 |
| 6,113,133 | A | * | 9/2000 | Iijima et al. | 280/730.1 |

FOREIGN PATENT DOCUMENTS

| | | | |
|---|---|---|---|
| DE | 299 17 343 U1 | | 1/2000 |
| DE | 100 04 307 A1 | * | 8/2001 |
| EP | 1 249 386 A1 | * | 10/2002 |
| JP | 9-328087 A | | 12/1997 |
| JP | 2001 219884 | | 8/2001 |
| JP | 2001-219884 A | | 8/2001 |
| JP | 2001 219885 | | 8/2001 |
| JP | 2001 233267 | | 8/2001 |

* cited by examiner

Primary Examiner—Ruth Ilan
(74) Attorney, Agent, or Firm—Birch, Stewart, Kolasch & Birch LLP

(57) ABSTRACT

To effectively restrain a rider on a seat provided at a rear portion of a vehicle body with an inflated air bag in a scooter type vehicle having a footrest for supporting the feet of the rider. An air bag that can be inflated so as to restrain a rider on a seat from the front side of the rider is accommodated in a folded condition inside a front end portion of the seat.

23 Claims, 5 Drawing Sheets

AIR BAG SYSTEM IN SCOOTER TYPE VEHICLE

CROSS-REFERENCE TO RELATED APPLICATIONS

This nonprovisional application claims priority under 35 U.S.C. §119(a) on Patent Application No. 2002-116680, filed in Japan on Apr. 18, 2002, the entirety of which is incorporated herein by reference.

BACKGROUND OF THE INVENTION

1. Field of the Invention

The present invention relates to a scooter type vehicle having a vehicle body, a seat provided at a rear portion of the vehicle body, and a footrest for supporting the feet of a rider on the seat. More particularly, the present invention is directed to an improvement in an air bag system for a scooter type vehicle.

2. Description of Background Art

In a motorcycle disclosed in Japanese Patent Laid-open No. 2001-219884, for example, an air bag in its folded condition is provided on the front side of a steering handle.

The vehicle body of a scooter type vehicle has such a shape that a large downward recessed space is defined between a seat for a rider and a steering handle. Accordingly, in the above configuration that the folded air bag is provided on the front side of the steering handle, there is a possibility that the restraining effect on the rider by the inflated air bag may be insufficient.

SUMMARY OF THE INVENTION

It is accordingly an object of the present invention to provide an air bag system in a scooter type vehicle, which can effectively restrain the rider on the seat by means of an inflated air bag.

In accordance with first aspect of the present invention, a scooter type vehicle includes a vehicle body, a seat provided at a rear portion of said vehicle body, and a footrest for supporting the feet of a rider on said seat. The scooter type vehicle includes an air bag system including an air bag accommodated in its folded condition inside a front end portion of said seat so that said air bag can be inflated so as to restrain said rider on said seat from the front side of said rider.

With this configuration, the air bag is inflated from the front end portion of the seat on which the rider is sitting. Accordingly, the rider on the seat can be effectively restrained by the inflated air bag.

In accordance with a second aspect of the present invention, the air bag system further includes an air bag housing having an opening for accommodating said air bag in its folded condition and a lid portion for normally closing said opening of said air bag housing, said lid portion being formed as a part of a bottom plate of said seat so that said lid portion can be opened in response to inflation of said air bag. With this configuration, the number of parts can be reduced by forming the lid portion as a part of the bottom plate of the seat.

In accordance with a third aspect of the present invention, the air bag system further includes an auxiliary air bag accommodated in its folded condition inside an instrument panel provided at a front portion of said vehicle body, said auxiliary air bag in its inflated condition supporting said air bag in its inflated condition from the front side of said air bag. With this configuration, the rider on the seat can be restrained more effectively by the air bag inflated from the front end portion of the seat and supported by the auxiliary air bag inflated from the instrument panel.

In accordance with a fourth aspect of the present invention, the air bag system further includes an air bag housing having an opening for accommodating said air bag in its folded condition and a lid portion for normally closing said opening of said air bag housing, said lid portion being embedded in said front end portion of said seat at a level higher than the level of a seating surface of said seat so that said lid portion can be opened in response to inflation of said air bag. With this configuration, the restraining effect on the waist of the rider by the inflated air bag can be improved.

In accordance with a fifth aspect of the present invention, said front end portion of said seat has an upper surface formed as a raised portion higher in level than said seating surface. With this configuration, the waist of the rider can also be restrained by the raised portion. This further improves the restraining effect experienced by the rider.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
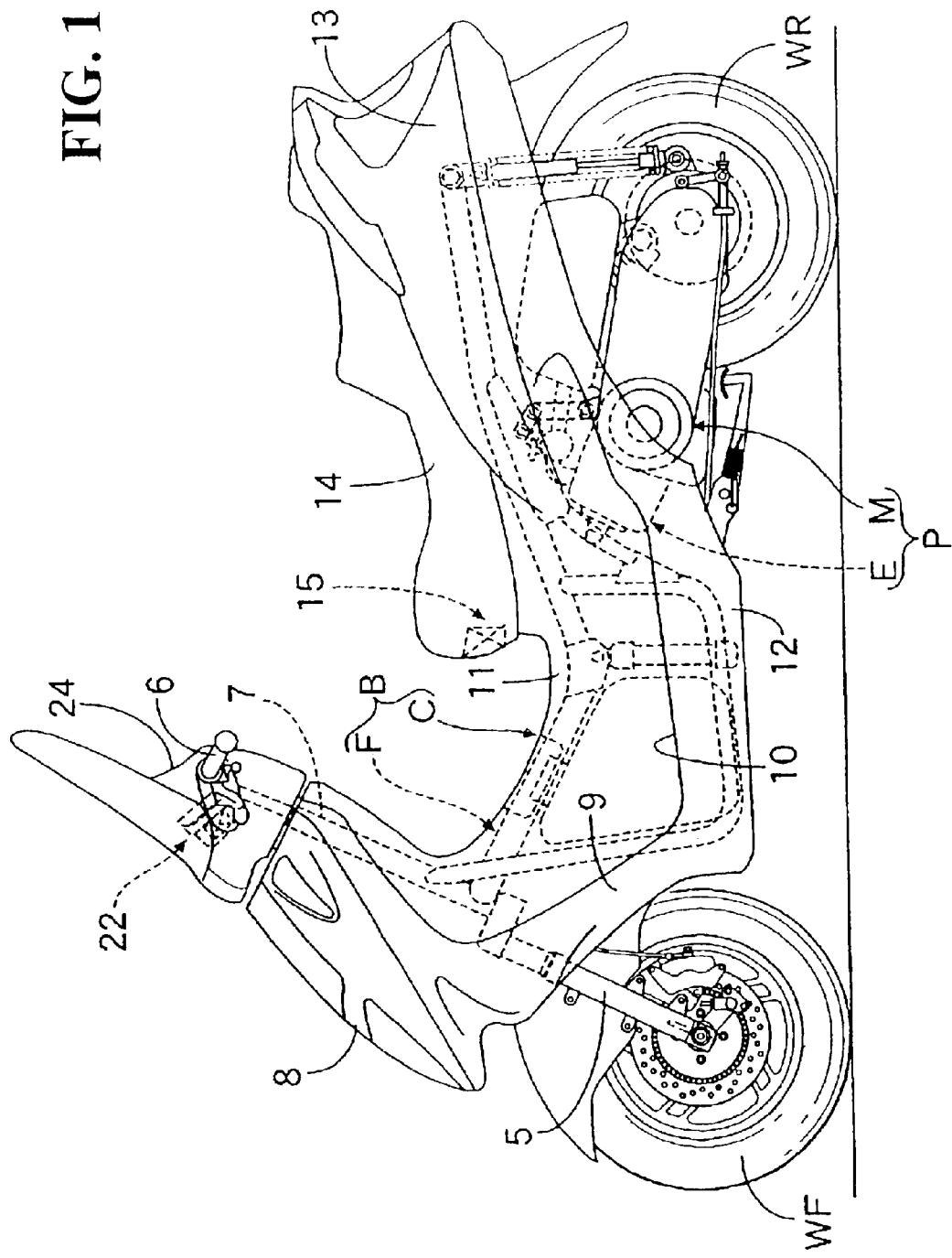
FIG. 1 is a side view of a scooter type motorcycle according to a first preferred embodiment of the present invention.

The present invention will now be described with reference to the attached drawings, wherein the same reference numerals have been used to identify the same or similar elements throughout the several views.

Figure 2:
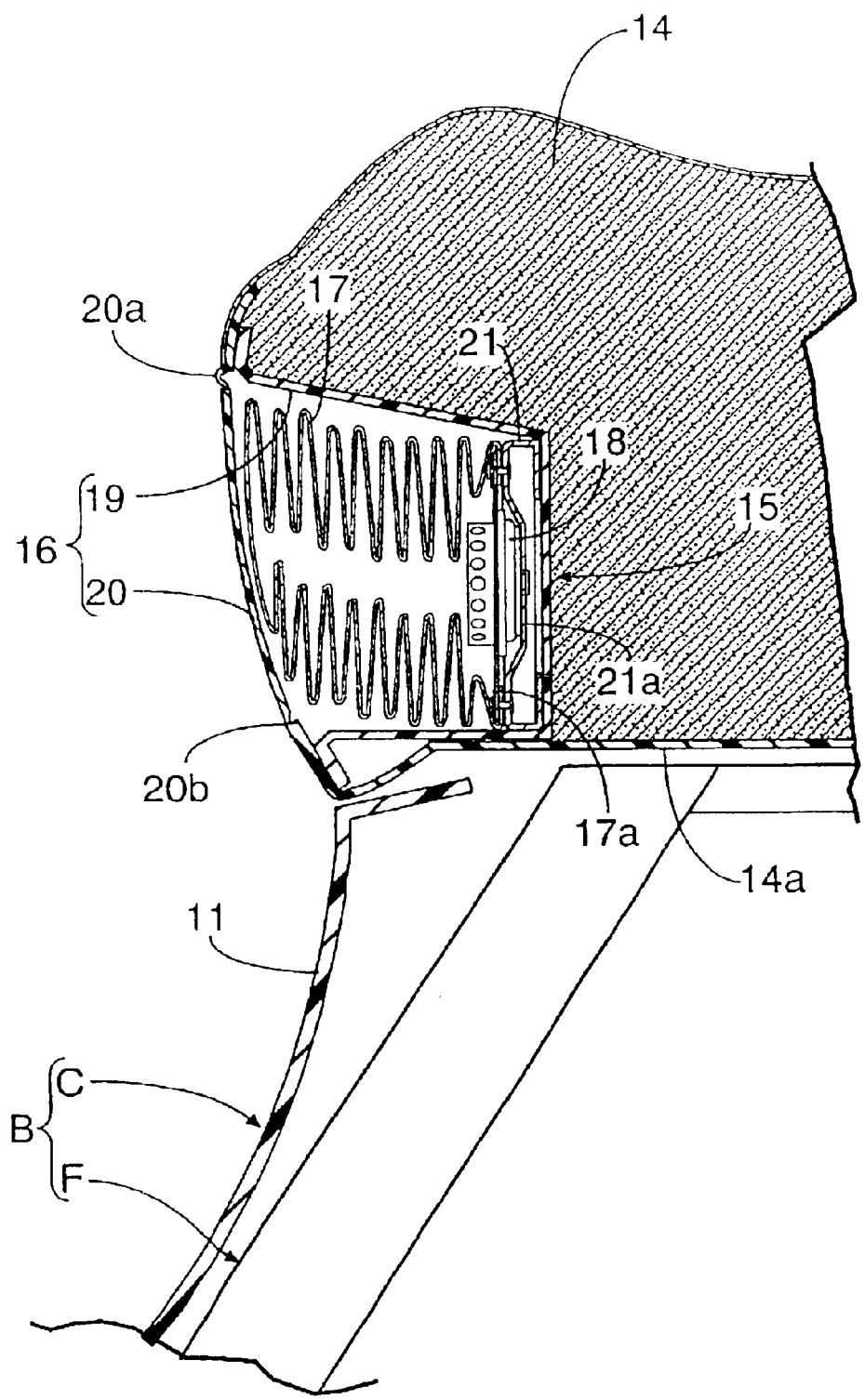
FIG. 2 is an enlarged vertical sectional view of a front end portion of a seat.
Figure 3:
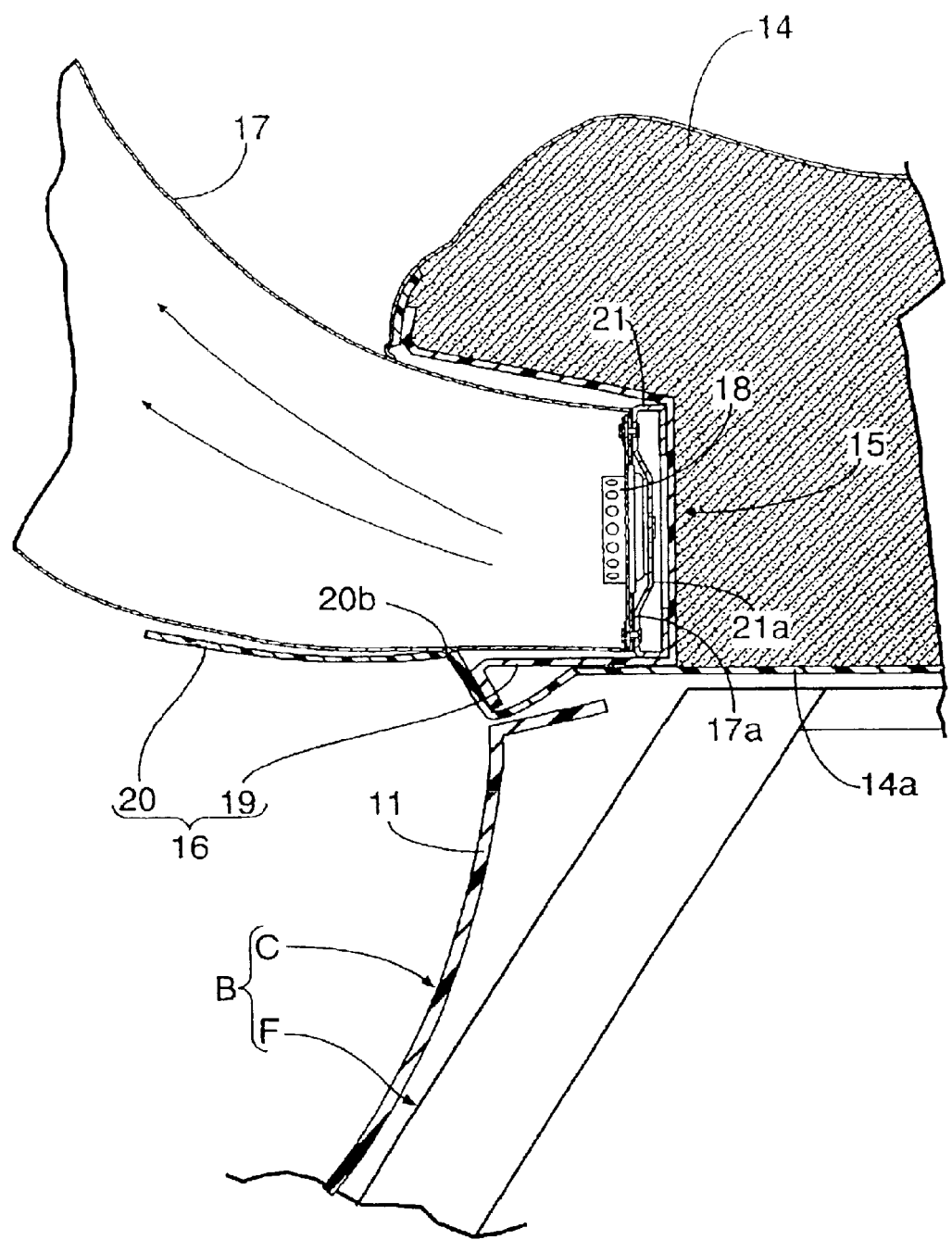
FIG. 3 is a sectional view similar to FIG. 2, showing a condition where an air bag is inflated.
Figure 4:
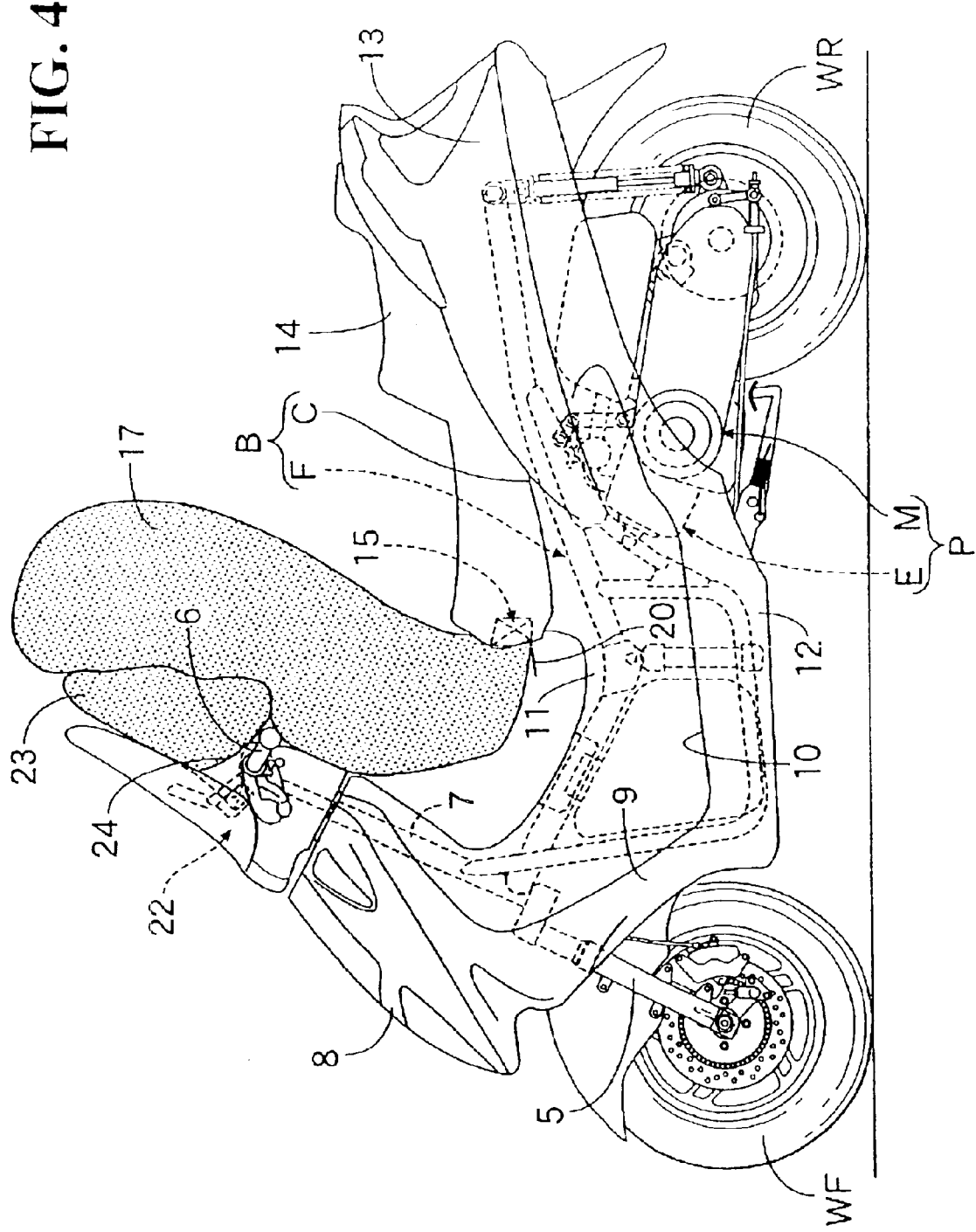
FIG. 4 is a side view similar to FIG. 1, showing a condition where the air bag and an auxiliary air bag are inflated.

FIGS. 1 to 4 show a first preferred embodiment of the present invention. FIG. 1 is a side view of a scooter type motorcycle. FIG. 2 is an enlarged vertical sectional view of a front end portion of a seat. FIG. 3 is a sectional view similar to FIG. 2, showing a condition where an air bag is inflated. FIG. 4 is a side view similar to FIG. 1, showing a condition where the air bag and an auxiliary air bag are inflated.

Referring first to FIG. 1, the scooter type motorcycle has a body frame F. The body frame F is provided at its front end with a head pipe 7 for steerably supporting a front fork 5 and a steering handle 6. The front fork 5 rotatably supports a front wheel WF. The steering handle 6 is connected to the front fork 5. A power unit P, which includes an engine E and a transmission M, is vertically swingably mounted on the body frame F at a middle portion thereof. Furthermore, a rear wheel WR is rotatably supported to the power unit P at a rear portion thereof. An output from the transmission M is transmitted to the rear wheel WR.

The body frame F and a body cover C formed of synthetic resin for covering the body frame F constitute a vehicle body B. The body cover C includes a front cover 8 for covering the head pipe 7 and an upper portion of the front wheel WF. A pair of right and left leg shields 9 are respectively connected to the right and left sides of the front cover 8 for covering the front side of the legs of a rider. A pair of right and left footrests 10 are respectively connected to the rear ends of the right and left leg shields 9 for supporting the feet of the rider. A floor tunnel portion 11 is connected between the right and left footrests 10 so as to be raised therefrom. A pair of right and left skirt portions 12 respectively depend from the outer side edges of the right and left footrests 10. Furthermore, a rear cover 13 is connected to the rear ends of the footrests 10 and the floor tunnel portion 11 for covering a rear portion of the body frame F.

A dual seat 14 as a combined rider's seat and passenger's seat is provided above the rear cover 13, or a rear portion of the vehicle body B. An air bag module 15 is provided in a front end portion of the seat 14.

As shown in FIG. 2, the air bag module 15 includes an air bag housing 16 that can be opened at a front end thereof. An air bag 17 is accommodated in a folded condition inside the air bag housing 16. Furthermore, an inflator 18 is provided for generating a gas for inflation of the air bag 17.

The air bag housing 16 is composed of a box-like housing body 19 having a front opening and a lid portion 20 for normally closing the front opening of the housing body 19. The housing body 19 and the lid portion 20 are formed of synthetic resin. The housing body 19 is provided inside the front end portion of the seat 14 and is fixed to a bottom plate 14a of the seat 14. The bottom plate 14a is also formed of synthetic resin. The lid portion 20 is formed as a part of the bottom plate 14a.

A support member 21 is accommodated in the housing body 19 and is fixed to the closed rear end of the housing body 19. The support member 21 has a dished portion 21a for mounting the inflator 18. The air bag 17 accommodated in the folded condition in the air bag housing 16 has an open portion 17a, which is mounted in a gas tight manner to the dished portion 21a of the support member 21 so as to surround the inflator 18.

A vulnerable portion 20a is formed along the upper and opposite side edges of the lid portion 20 of the air bag housing 16. A hinge portion 20b is formed along the lower edge of the lid portion 20. As shown in FIG. 3, the vulnerable portion 20a is easily broken by a force produced by the inflation of the air bag 17, which is applied to the lid portion 20. The lid portion 20 is opened with the hinge portion 20b acting as a fulcrum simultaneously with the breaking of the vulnerable portion 20a.

Referring again to FIG. 1, an instrument panel 24 is provided at a front portion of the vehicle body B, or a front portion of the body cover C. An air bag module 22 is accommodated inside the instrument panel 24. As shown in FIG. 4, the air bag module 22 includes an auxiliary air bag 23 for supporting the air bag 17 in its inflated condition from the front side thereof. The auxiliary air bag 23 is accommodated in a folded condition inside the instrument panel 24 at a position on the front side of the air bag 17.

The operation of the first preferred embodiment will now be described. The air bag 17 that can be inflated so as to restrain the rider on the seat 14 from the front side thereof is accommodated in its folded condition inside the front end portion of the seat 14. Accordingly, the rider on the seat 14 can be effectively restrained by the inflated air bag 17.

Furthermore, the auxiliary air bag 23 for supporting the inflated air bag 17 from the front side thereof is accommodated in a folded condition inside the instrument panel 24 located at the front portion of the vehicle body B. Accordingly, by making the inflated auxiliary air bag 23 support the inflated air bag 17 from the front side thereof, the rider on the seat 14 can be restrained by the inflated air bag 17 more effectively as compared with when the auxiliary air bag 23 is absent.

Furthermore, the lid portion 20 normally closes the front opening of the housing body 19 of the air bag housing 16, which is embedded in the front end portion of the seat 14 for accommodating the air bag 17 in its folded condition. The lid portion 20 can be opened in response to the inflation of the air bag 17. The lid portion 20 is formed as a part of the bottom plate 14a of the seat 14. Accordingly, the number of parts constituting the air bag module 15 can be reduced.

Figure 5:
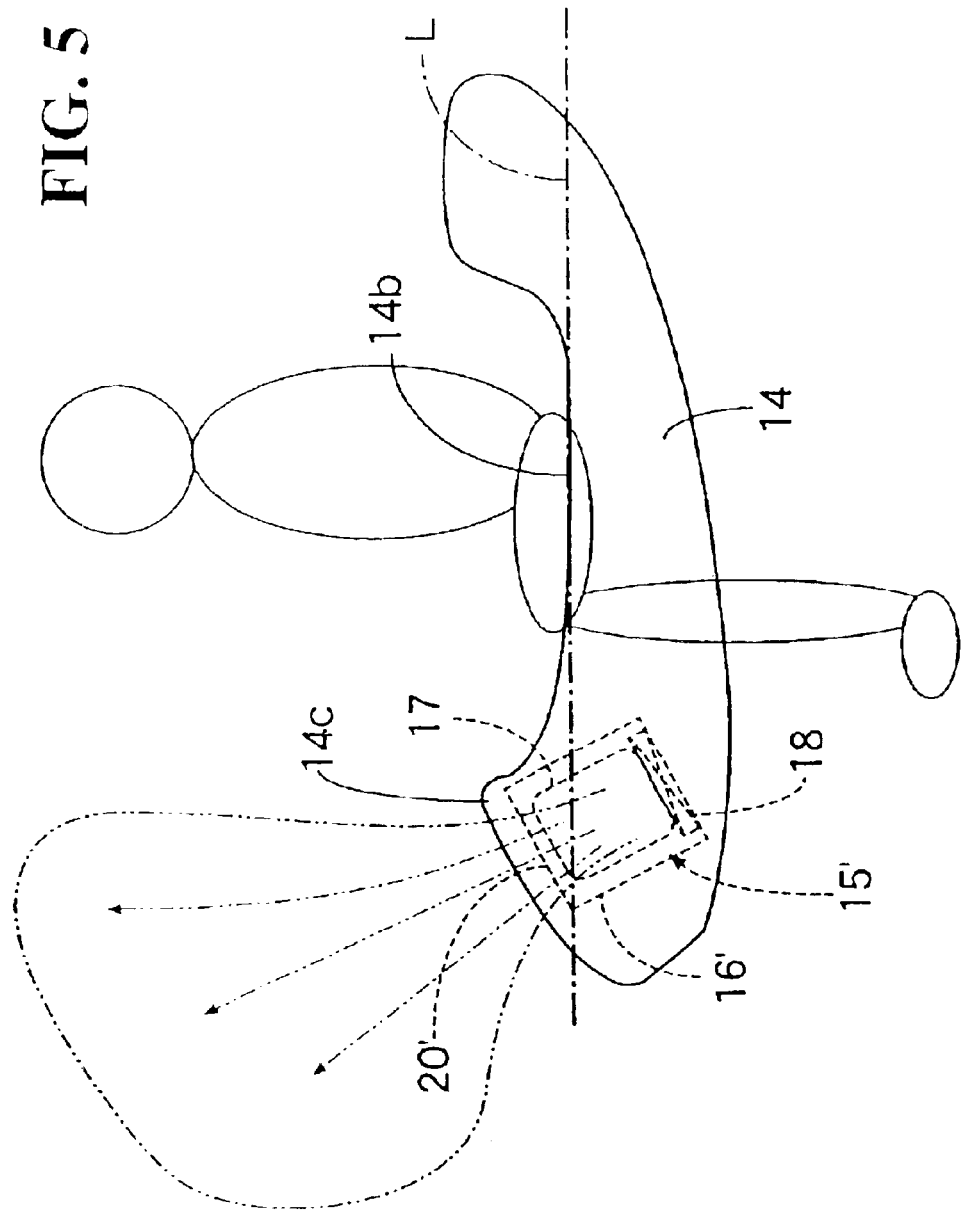
FIG. 5 is a side view of a seat containing an air bag according to a second preferred embodiment of the present invention.

FIG. 5 shows a second preferred embodiment of the present invention. In this preferred embodiment, an air bag module 15' is accommodated in a front end portion of the seat 14. The air bag module 15' includes an air bag housing 16' having a front opening normally closed by a lid portion 20'. An air bag 17 is accommodated in a folded condition inside the air bag housing 16'. Furthermore, an inflator 18 is provided for generating gas for inflation of the air bag 17.

The air bag housing 16' is formed independently of the seat 14 and is embedded in the front end portion of the seat 14. The lid portion 20' normally closes the front opening of the air bag housing 16' so that the lid portion 20' can be opened in response to the inflation of the air bag 17.

The air bag housing 16' is accommodated inside the front end portion of the seat 14 so that the lid portion 20' is located at a level higher than the level of a seating surface 14b of the seat 14, i.e., at a level higher than the level of a horizontal line L lying on the seating surface 14b.

Furthermore, the upper surface of the front end portion of the seat 14 is formed as a raised portion 14c, which is raised to a level higher than the seating surface 14b. A part of the front end portion of the seat 14, which is opposed to the lid portion 20' of the air bag module 15', can be easily broken by a force generated by the inflation of the air bag 17, which is applied to the lid portion 20' at the time the lid portion 20' is opened. Accordingly, the air bag 17 can be inflated toward the front side of a rider on the seating surface 14b of the seat 14 as shown by a phantom line in FIG. 5.

According to the second preferred embodiment, the restraining effect on the waist of the rider by the inflated air bag 17 can be improved. Moreover, the raised portion 14c functions to also restrain the waist of the rider, thereby further improving the restraining effect.

Having thus described the specific preferred embodiments of the present invention, it should be noted that the present invention is not limited to the above preferred embodiments, but various modifications may be made without departing from the scope of the present invention as defined in the claims.

For example, while the first preferred embodiment is applied to a scooter type motorcycle, the present invention is applicable also to a scooter type three-wheeled vehicle. It should also be noted that the term "scooter type vehicle" encompasses a motorcycle.

According to the first aspect of the present invention, the rider on the seat can be effectively restrained by the air bag.

According to the second aspect of the present invention, the number of parts can be reduced by forming the lid portion as a part of the bottom plate of the seat.

According to the third aspect of the present invention, the rider on the seat can be restrained more effectively by the air bag inflated from the front end portion of the seat.

According to the fourth aspect of the present invention, the restraining effect on the waist of the rider by the air bag can be improved.

According to the fifth aspect of the present invention, the restraining effect can be further improved by the raised portion for restraining the waist of the rider.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A saddle-ridden vehicle, comprising:
a vehicle body;
a straddle seat provided at a rear portion of said vehicle body;
a footrest for supporting the feet of a rider on said seat;
an air bag housing, said air bag housing being located inside a front end portion of said seat; and
an air bag system, said air bag system including an air bag accommodated in a folded condition inside said air bag housing, said air bag being capable of inflating so as to restrain the rider on said seat from a front side of the rider.

2. The vehicle according to claim 1, wherein said air bag housing has an opening for accommodating said air bag in the folded condition and a lid portion for normally closing said opening of said air bag housing, said lid portion being formed as a part of a bottom plate of said seat so that said lid portion can be opened in response to inflation of said air bag.

3. The vehicle according to claim 1, wherein said air bag system further comprises an auxiliary air bag accommodated in a folded condition inside an instrument panel provided at a front portion of said vehicle body, said auxiliary air bag being capable of inflating to support said air bag in the inflated condition from a front side of said air bag.

4. The vehicle according to claim 1, wherein said air bag housing has an opening for accommodating said air bag in the folded condition and a lid portion for normally closing said opening of said air bag housing, said lid portion being embedded in said front end portion of said seat at a level higher than a level of a seating surface of said seat so that said lid portion can be opened in response to inflation of said air bag.

5. The vehicle according to claim 4, wherein said front end portion of said seat has an upper surface formed as a raised portion higher in level than said seating surface.

6. The vehicle according to claim 1, wherein said vehicle is a scooter.

7. The vehicle according to claim 1, wherein said air bag system further comprises an inflator, said inflator being located in the front end portion of said seat and in communication with said air bag to inflate said air bag.

8. The vehicle according to claim 2, wherein said air bag system further comprises an inflator, said inflator being located in said airbag housing and in communication with said air bag to inflate said air bag.

9. The vehicle according to claim 4, wherein said air bag system further comprises an inflator, said inflator being located in said airbag housing and in communication with said air bag to inflate said air bag.

10. An air bag system for a saddle-ridden vehicle, the vehicle including a vehicle body; a straddle seat provided at a rear portion of the vehicle body; and a footrest for feet of a rider on the seat, said air bag system comprising:
said straddle seat;
an air bag housing, said air bag housing being located inside a front end portion of said seat; and
an air bag, said air bag being accommodated in a folded condition inside said air bag housing, said air bag being capable of inflating so as to restrain the rider on said seat from a front side of the rider.

11. The air bag system according to claim 10, wherein said air bag housing has an opening for accommodating said air bag in the folded condition and a lid portion for normally closing said opening of said air bag housing, said lid portion being formed as a part of a bottom plate of said seat so that said lid portion can be opened in response to inflation of said air bag.

12. The air bag system according to claim 10, wherein said air bag system further comprises an auxiliary air bag, said auxiliary air bag being capable of accommodation in a folded condition inside an instrument panel provided at a front portion of the vehicle body, said auxiliary air bag being capable of inflating to support said air bag in the inflated condition from a front side of said air bag.

13. The air bag system according to claim 10, wherein said air bag housing has an opening for accommodating said air bag in the folded condition and a lid portion for normally closing said opening of said air bag housing, said lid portion being embedded in said front end portion of said seat at a level higher than a level of a seating surface of said seat so that said lid portion can be opened in response to inflation of said air bag.

14. The air bag system according to claim 13, wherein said front end portion of said seat has an upper surface formed as a raised portion higher in level than said seating surface.

15. The air bag system according to claim 10, wherein said air bag system further comprises an inflator, said inflator being located in the front end portion of said seat and in communication with said air bag to inflate said air bag.

16. The air bag system according to claim 11, wherein said air bag system further comprises an inflator, said inflator being located in said airbag housing and in communication with said air bag to inflate said air bag.

17. The air bag system according to claim 13, wherein said air bag system further comprises an inflator, said inflator being located in said airbag housing and in communication with said air bag to inflate said air bag.

18. An air bag system for a saddle-ridden vehicle, comprising:
a straddle seat;
an air bag housing, said air bag housing being embedded inside a front end portion of said seat; and
an air bag, said air bag being accommodated in a folded condition inside said air bag housing, said air bag being capable of inflating so as to restrain a rider on said seat from a front side of the rider.

19. The air bag system according to claim 18, wherein said air bag housing has an opening for accommodating said air bag in the folded condition and a lid portion for normally closing said opening of said air bag housing, said lid portion being formed as a part of a bottom plate of said seat so that said lid portion can be opened in response to inflation of said air bag.

20. The air bag system according to claim 18, wherein said air bag system further comprises an auxiliary air bag, said auxiliary air bag being capable of accommodation in a folded condition inside an instrument panel provided at a front portion of the vehicle body, said auxiliary air bag being capable of inflating to support said air bag in the inflated condition from a front side of said air bag.

21. The air bag system according to claim 18, wherein said air bag housing has an opening for accommodating said air bag in the folded condition and a lid portion for normally closing said opening of said air bag housing, said lid portion being embedded in said front end portion of said seat at a level higher than a level of a seating surface of said seat so that said lid portion can be opened in response to inflation of said air bag.

22. The air bag system according to claim 21, wherein said front end portion of said seat has an upper surface formed as a raised portion higher in level than said seating surface.

23. The air bag system according to claim 18, wherein said air bag system further comprises an inflator, said inflator being located in the front end portion of said seat and in communication with said air bag to inflate said air bag.

* * * * *